(12) United States Patent
Bish et al.

(10) Patent No.: US 7,975,100 B2
(45) Date of Patent: Jul. 5, 2011

(54) SEGMENTATION OF LOGICAL VOLUMES AND MOVEMENT OF SELECTED SEGMENTS WHEN A CACHE STORAGE IS UNABLE TO STORE ALL SEGMENTS OF A LOGICAL VOLUME

(75) Inventors: Thomas William Bish, Tucson, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 11/841,607

(22) Filed: Aug. 20, 2007

(65) Prior Publication Data
US 2009/0055582 A1 Feb. 26, 2009

(51) Int. Cl.
*G06F 12/00* (2006.01)
*G06F 13/00* (2006.01)
*G06F 13/28* (2006.01)

(52) U.S. Cl. ........................................................ 711/113
(58) Field of Classification Search .................... 711/113
See application file for complete search history.

(56) References Cited

U.S. PATENT DOCUMENTS

| | | | |
|---|---|---|---|
| 5,502,811 A * | 3/1996 | Ripberger | 714/6 |
| 5,911,148 A * | 6/1999 | Anglin et al. | 711/111 |
| 6,003,115 A | 12/1999 | Spear et al. | |
| 6,256,706 B1 | 7/2001 | Carlson et al. | |
| 6,453,383 B1 | 9/2002 | Stoddard et al. | |
| 6,532,548 B1 | 3/2003 | Hughes | |
| 6,597,883 B2 | 7/2003 | Muramatsu et al. | |
| 6,704,842 B1 | 3/2004 | Janakiraman et al. | |
| 6,816,957 B1 | 11/2004 | Halladay et al. | |
| 6,978,324 B1 | 12/2005 | Black | |
| 7,000,143 B2 | 2/2006 | Moulton et al. | |
| 2003/0028831 A1 | 2/2003 | Bickers et al. | |
| 2004/0034736 A1 | 2/2004 | Horn | |
| 2004/0044851 A1 | 3/2004 | Dawson et al. | |
| 2004/0044853 A1 | 3/2004 | Gibble et al. | |

(Continued)

FOREIGN PATENT DOCUMENTS

EP 1202159 A 5/2002

(Continued)

OTHER PUBLICATIONS

Article 19 amendment for PCT Application No. PCT/EP2008/060272 filed Aug. 5, 2008.

(Continued)

*Primary Examiner* — Kevin L Ellis
*Assistant Examiner* — Chad L Davidson
(74) *Attorney, Agent, or Firm* — Rabindranath Dutta; Konrad Raynes & Victor LLP

(57) ABSTRACT

Provided are a method, system, and article of manufacture, wherein a storage manager application implemented in a first computational device maintains a virtual logical volume that represents a plurality of segments of a linear storage medium of a secondary storage, wherein the virtual logical volume and the plurality of segments are created by the storage manager application. A request for data is received at the first computational device, from a second computational device. The storage manager application moves selected segments of the plurality of segments from the linear storage medium of the secondary storage to a cache storage, in anticipation that the requested data is included in the selected segments that are moved from the linear storage medium of the secondary storage to the cache storage.

35 Claims, 7 Drawing Sheets

U.S. PATENT DOCUMENTS

| | | | |
|---|---|---|---|
| 2004/0044862 A1 | 3/2004 | Carlson et al. | |
| 2004/0205298 A1* | 10/2004 | Bearden et al. | 711/137 |
| 2004/0250043 A1 | 12/2004 | Ripberger et al. | |
| 2005/0050263 A1 | 3/2005 | Ashton et al. | |
| 2006/0023357 A1* | 2/2006 | Deckers et al. | 360/134 |
| 2006/0031656 A1 | 2/2006 | Carlson et al. | |
| 2006/0136771 A1 | 6/2006 | Watanabe | |
| 2006/0149898 A1* | 7/2006 | Bello et al. | 711/111 |
| 2008/0040540 A1 | 2/2008 | Cavallo | |

FOREIGN PATENT DOCUMENTS

| | | |
|---|---|---|
| WO | 2005101182 A | 10/2005 |

OTHER PUBLICATIONS

PCT International Search Report and Written Opinion dated Dec. 5, 2008 for Application No. PCT/EP2008/060272 filed Aug. 5, 2008.

US Patent Application entitled "Storing Redundant Segments and Parity Information for Segmented Logical Volumes", Serial No. unknown, Filing Date Aug. 20, 2007, by inventors G.T. Kishi.

US Patent Application entitled "Maintaining Reserved Free Space for Segmented Logical Volumes", Serial No. unknown, Filing Date Aug. 20, 2007, by inventors G.T. Kishi and J.M. Swingler.

* cited by examiner

SEGMENTATION OF LOGICAL VOLUMES AND MOVEMENT OF SELECTED SEGMENTS WHEN A CACHE STORAGE IS UNABLE TO STORE ALL SEGMENTS OF A LOGICAL VOLUME

BACKGROUND

1. Field

The disclosure relates to a method, system, and article of manufacture for the segmentation of logical volumes.

2. Background

In certain virtual tape storage systems, hard disk drive storage may be used to emulate tape drives and tape cartridges. For instance, host systems may perform input/output (I/O) operations with respect to a tape library by performing I/O operations with respect to a set of hard disk drives that emulate the tape library. In certain virtual tape storage systems at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a cache to volumes in the tape library. In VTS operations, the VTS processes the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache. However, since the capacity of the cache is relatively small when compared to the capacity of the tape library, not all volumes can be kept in the cache. Hence, the VTS may migrate volumes from the cache to the tape library, i.e., the VTS may transfer data from the cache to the tape cartridges in the tape library.

SUMMARY OF THE PREFERRED EMBODIMENTS

Provided are a method, system, and article of manufacture, wherein a storage manager application implemented in a first computational device maintains a virtual logical volume that represents a plurality of segments of a linear storage medium of a secondary storage, wherein the virtual logical volume and the plurality of segments are created by the storage manager application. A request for data is received at the first computational device, from a second computational device. The storage manager application moves selected segments of the plurality of segments from the linear storage medium of the secondary storage to a cache storage, in anticipation that the requested data is included in the selected segments that are moved from the linear storage medium of the secondary storage to the cache storage.

In additional embodiments, the cache storage is incapable of storing at the same time all segments of the plurality of segments represented by the logical volume.

In yet additional embodiments, the plurality of segments comprise a first segment comprising header information, a last segment comprising trailer information, and intervening segments between the first segment and the last segment, wherein the selected segments include at least the first segment and the last segment, and wherein the storage manager application moves the first segment and the last segment of the plurality of segments from the linear storage medium of the secondary storage to the cache storage before any other segments of the plurality of segments.

In further embodiments, the plurality of segments comprise a first segment comprising header information, a last segment comprising trailer information, and intervening segments between the first segment and the last segment, wherein while writing data from the cache storage to the secondary storage to create space for additional data in the cache storage, the storage manager application writes the first segment and the last segment of the plurality of segments from the cache storage to the secondary storage before any other segments of the plurality of segments, and subsequently deletes the first and the last segment from the cache storage.

In yet further embodiments, the plurality of segments comprise a hybrid segment comprising header information and trailer information, and other segments that follow the hybrid segment, wherein the selected segments includes at least the hybrid segment, and wherein the storage manager application moves the hybrid segment of the plurality of segments from the linear storage medium of the secondary storage to the cache storage, before any of the other segments of the plurality of segments.

In certain embodiments, subsequent to the moving of the selected segments, a determination is made that the selected segments do not include the data requested by the second computational device. Additional segments not included in the selected segments are moved from the secondary storage to the cache storage, in response to determining that the additional segments are more likely to include the data requested by the second computational device in comparison to other segments of the plurality of segments that are present in the linear storage medium but have not been moved to the cache storage.

In further embodiments, the first computational device is a virtual tape server, the second computational device is a host, the cache storage is implemented in a disk device, the secondary storage is implemented in a tape device, the linear storage medium is a tape, wherein all contents of the virtual logical volume fit on a single tape included in the tape device, and wherein all contents of the virtual logical volume do not fit at the same time on the cache storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Handling Logical Volumes a Single Entity

In certain VTS systems, logical volumes are handled as a single entity. However, when the size of physical volumes corresponding to logical volumes becomes very large, such as in Linear Tape Open (LTO) drives, all data included in logical volumes may not be accommodated at the same time in the cache storage. Additionally, transfer operations of large logical volumes from the secondary storage to the cache storage may take a significantly greater amount of time in comparison to small logical volumes. The recall times for data may become excessively large in situations where logical volumes are handled as a single entity for transfer to the cache storage from the secondary storage in a VTS environment.

Exemplary Embodiments

Certain embodiments provide for the segmentation of virtual logical volumes in a VTS environment comprising a VTS that is coupled to a cache storage and a secondary storage, wherein the segmented virtual logical volumes are used to respond to data requests from a host. In certain embodiments, all contents of a segmented virtual logical volume may fit on a single tape included in the secondary storage, wherein all the contents of the segmented virtual logical volume may not fit at the same time in the cache storage. Once a logical volume is segmented, certain embodiments use the segmented logical volume for better recall performance by premigrating certain segments of the logical volume out of order to the cache storage from the secondary storage.

Figure 1:
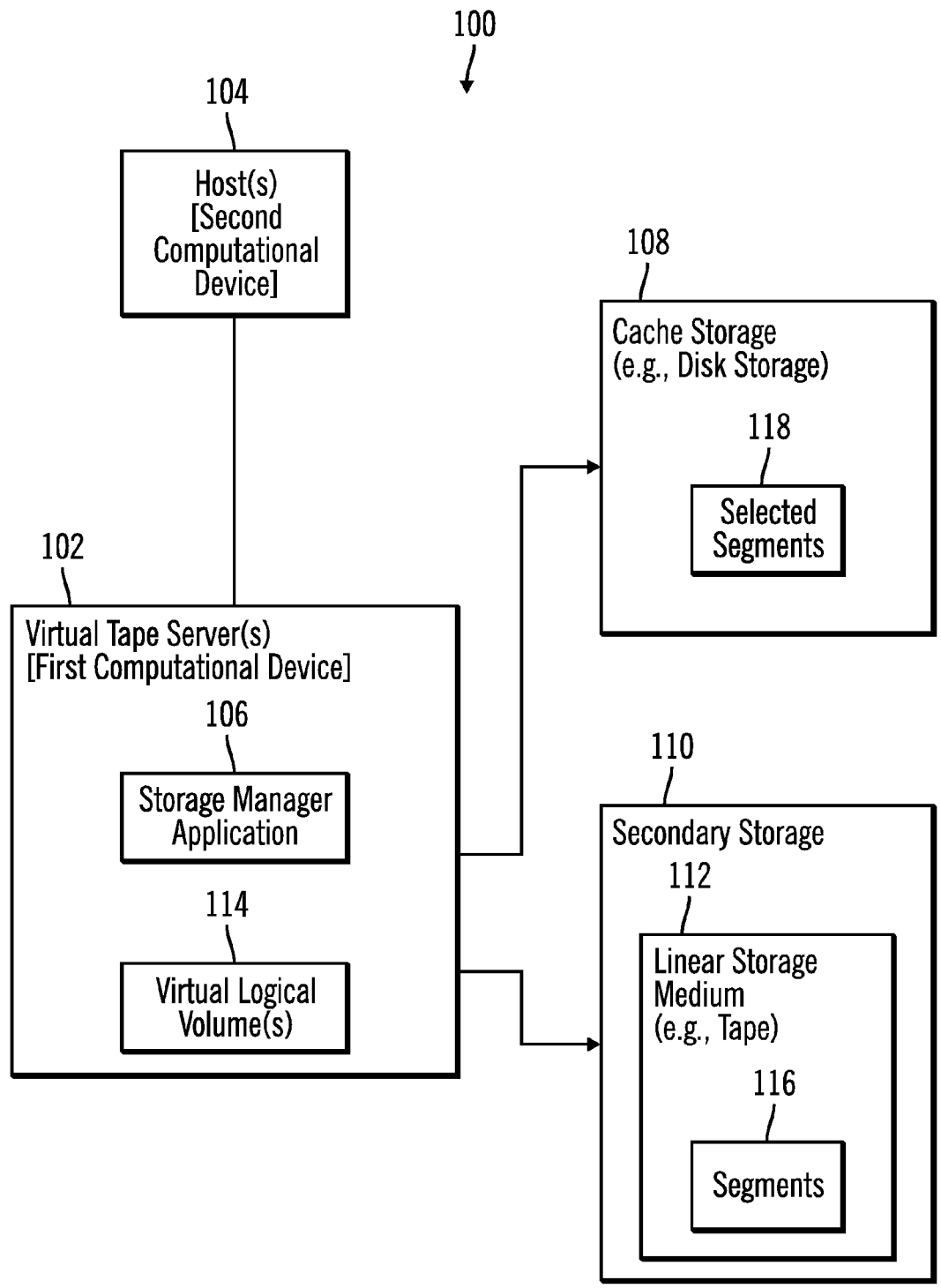
FIG. 1 illustrates a block diagram of a computing environment, in accordance with certain embodiments.

FIG. 1 illustrates a block diagram of a computing environment 100, in accordance with certain embodiments. The computing environment 100 includes a VTS 102. Additional VTSs can be deployed, but for purposes of illustration, a single VTS 102 is shown. In certain exemplary embodiments the VTS 102 may comprise a server computational device and may include any operating system known in the art. However, in alternative embodiments the VTS 102 may comprise any suitable computational device, such as a personal computer, a workstation, mainframe, a hand held computer, a palm top computer, a telephony device, network appliance, etc. The VTS 102 may be referred to as a first computational device 102.

The computing environment also includes a host 104 that is coupled to the VTS 102. Additional hosts may be deployed, but for purposes of illustration, a single host 104 is shown. The host 104 may be may coupled to the VTS 102 through a host data interface channel or any other direct connection or switching mechanism, known in the art (e.g., fibre channel, Storage Area Network (SAN) interconnections, etc.). The host 104 may be any suitable computational device known in the art, such as a personal computer, a workstation, a server, a mainframe, a hand held computer, a palm top computer, a telephony device, network appliance, etc.

The VTS 102 includes at least one application, such as a storage manager application 106 that manages storage. The storage manager application 106 may be implemented either as a standalone application or as a part of one or more other applications. The storage manager application 106 manages a cache storage 108, such as a disk based storage system, and a secondary storage 110 comprising a linear storage medium 112, such as a tape, wherein the cache storage 108 and the secondary storage 110 are coupled to the VTS 102 via a direct connection or via a network connection. The cache storage 108 improves performance by allowing host I/O requests from the hosts 104 to the secondary storage 110 to be serviced from the faster access cache storage 108 as opposed to the slower access secondary storage 110. The disks in the cache storage 108 may be arranged as a Direct Access Storage Device (DASD), Just a Bunch of Disks (JBOD), Redundant Array of Inexpensive Disks (RAID), etc.

The storage manager application 106 may perform or manage the data movement operations between the host 104, the cache storage 108, and the secondary storage 110. The storage manager application 106 generates virtual logical volumes 114, wherein virtual logical volumes 114 are logical representations of data stored in cache storage 108 and the secondary storage 110.

The storage manager application 106 maps the data stored in the cache storage 108 and secondary storage 110 to a plurality of virtual logical volumes 114. The hosts 104 perform I/O operations by using the virtual logical volumes 114 via the VTS 102. The storage manager application 106 maps the virtual logical volumes 114 to the linear storage medium 112 of the secondary storage 110. Thus, the virtual logical volumes 114 correspond to segments 116 stored in the linear storage medium 112 of the secondary storage 110.

In certain embodiments, the storage manager application 106 implemented in the VTS 102 (first computational device) maintains the virtual logical volume 114 that represents a plurality of segments 116 of the linear storage medium 112 of the secondary storage 110, wherein the virtual logical volume 114 and the plurality of segments 116 are created by the storage manager application 106. In response to a request for data received at the VTS 102, from the host 104, the storage manager application 106 moves selected segments 118 of the plurality of segments 116 from the linear storage medium 112 of the secondary storage 110 to the cache storage 108, in anticipation that the requested data is included in the selected segments 118 that are moved from the linear storage medium 112 to the cache storage 108. In certain embodiments all contents of the virtual logical volume 114 fit on a single tape included in the secondary storage 110, wherein all contents of the virtual logical volume 114 do not fit at the same time on the cache storage 108. By storing all contents of the virtual logical volume 114 on a single tape, data can be recalled faster in comparison to situations where the contents of the virtual logical volume 114 are distributed among a plurality of tapes.

Figure 2:
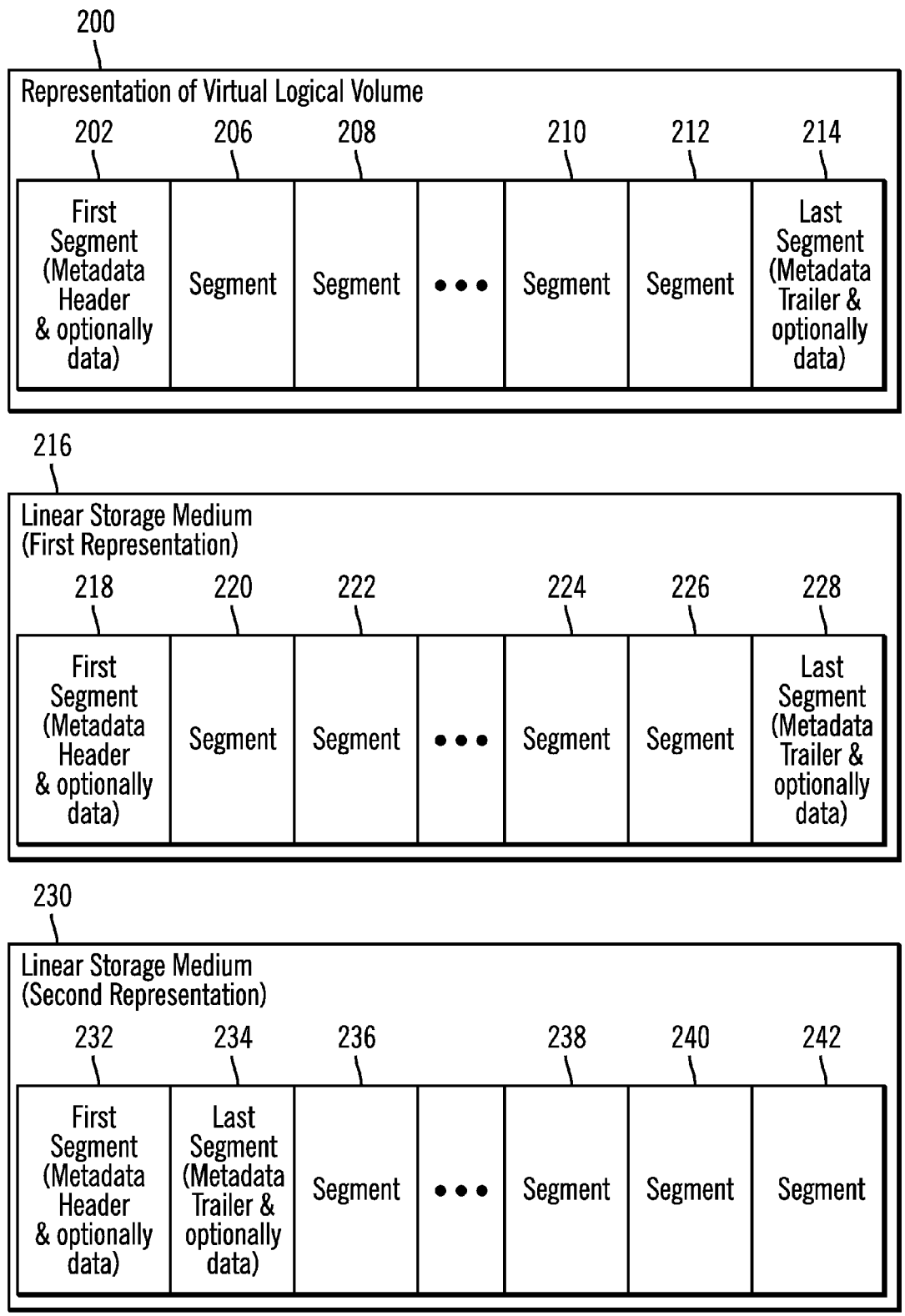
FIG. 2 illustrates a block diagram of representations of logical volumes and a first and a second representation of linear tapes in accordance with certain embodiments.

FIG. 2 illustrates a block diagram of representations of virtual logical volumes and a first and a second representation of a linear storage medium 112 in accordance with certain embodiments that may be implemented in the computing environment 100.

One representation 200 of a virtual logical volume 114 may comprise a first segment 202, a plurality of segments 206, 208, 210, 212, and a last segment 214, wherein a segment is a unit of data storage. A greater or a fewer number of segments than shown in FIG. 2 may be implemented in certain embodiments. The first segment 202 may include metadata comprising header information and may optionally include data, wherein metadata is information about data. The last segment 214 may include metadata comprising trailer information and may optionally include data. The other segments 206, 208, 210, 212 may include data. Thus header information about the data is stored in the first segment 202 and trailer information about the data is stored in the last segment 214, whereas the data may be distributed in some or all of the segments 202, 204, 206, 208, 210, 212, 214.

In a first representation 216 of the linear storage medium 112 that is implemented in certain embodiments, wherein the first representation 216 of the linear storage medium 112 corresponds to the representation 200 of the virtual logical volume 114, the plurality of segments 202, 206, 208, 210, 212, 214 that are stored in the linear storage medium 112 comprise a first segment 218 comprising header information and optionally data, a last segment 228 comprising trailer information and optionally data, and exemplary intervening segments 220, 222, 224, 226 between the first segment 218 and the last segment 228, wherein the selected segments 118 that are moved to the cache storage 108 include at least the first segment 218 and the last segment 228, and wherein the storage manager application 106 moves the first segment 218 and the last segment 228 of the plurality of segments 218, 220, 222, 224, 226, 228 from the linear storage medium 112 of the secondary storage 110 to the cache storage 108 before any other segments of the plurality of segments 218, 220, 222, 224, 226, 228.

In a second representation 230 of the linear storage medium 112 that is implemented in certain embodiments, the plurality of segments 232, 234, 236, 238, 240, 242, comprise a first segment 232 comprising header information and optionally data, followed by a last segment 234 comprising trailer information and optionally data, wherein the first and the last segments 232, 234 are followed by other segments 236, 238, 240, 242 that include data. A representation of the virtual logical volume 114 corresponding to the second representation 230 may also be generated by the storage manager application 106.

Therefore, FIG. 2 illustrates certain exemplary representations of the virtual logical volumes 114 and the linear storage medium 112.

Figure 3:
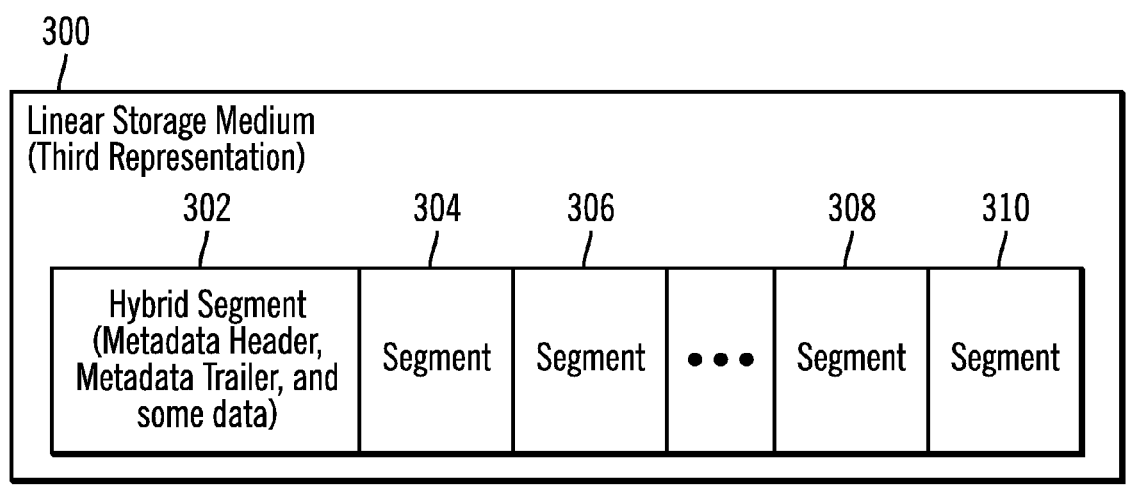
FIG. 3 illustrates a block diagram of a third representation of linear tapes in accordance with certain embodiments.

FIG. 3 illustrates a block diagram of a third representation 300 of a linear storage medium 112 in accordance with certain embodiments that may be implemented in the computing environment 100.

In the third representation 300 of the linear storage medium 112, the plurality of segments 302, 304, 306, 308, 310 comprise a hybrid segment 302 comprising header information and trailer information and optionally data, and other segments 304, 306, 308, 310 that follow the hybrid segment 302, wherein the selected segments 118 in the cache storage 108 include at least the hybrid segment 302, and wherein the storage manager application 106 moves the hybrid segment 302 of the plurality of segments 302, 304, 306, 308, 310 from the linear storage medium 112 of the secondary storage 110 to the cache storage 108, before any of the other segments of the plurality of segments 302, 304, 306, 308, 310.

Therefore, FIG. 3 illustrates certain embodiments in which a hybrid segment 302 that includes both header and trailer information is moved from the secondary storage 110 to the cache storage 108 by the storage manager application 106, in response to a data request received from the host 104.

Figure 4:
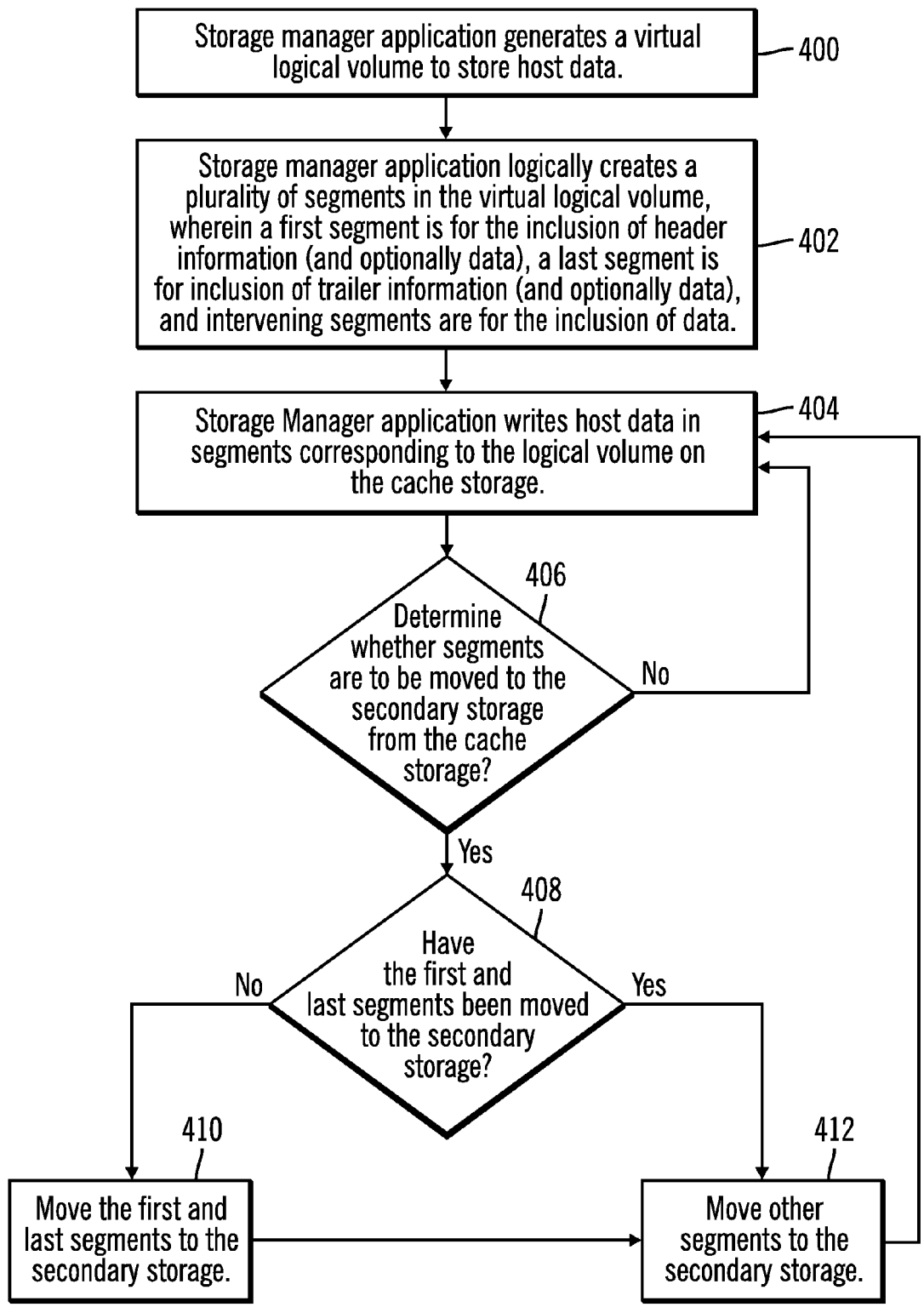
FIG. 4 illustrates operations for moving data from a cache to a secondary storage, in accordance with certain embodiments.

FIG. 4 illustrates operations for moving data from a cache storage 108 to a secondary storage 110, in accordance with certain embodiments. The operations may be implemented by the storage manager application 106 included in the VTS 102.

Control starts at block 400 in which the storage manager application 106 generates a virtual logical volume 114 to store host data, wherein host data is data received from the host 104 for storage in the secondary storage 110.

The storage manager application 106 logically creates (at block 402) a plurality of segments (e.g., segments 202, 204, 206, 208, 210, 212, 214) in the virtual logical volume 114, wherein a first segment 202 is for the inclusion of header information (and optionally data), a last segment 214 is for inclusion of trailer information (and optionally data), and intervening segments 206, 208, 210, 212 are for the inclusion of data.

The storage manager application 106 writes (at block 404) host data in segments corresponding to the virtual logical volume 114 on the cache storage 108.

The storage manager application 106 then determines (at block 406) whether segments are to be moved to the secondary storage 110 from the cache storage 108. For example, if the cache storage 108 is full then segments may have to be moved from cache storage 108 to the secondary storage 110.

If at block 406, a determination is made that segments are to be moved to the secondary storage 110 from the cache storage 108, then a determination is made at block 408 as to whether the first and last segments have been moved to the secondary storage 110. If not, then the storage manager application 106 moves (at block 410) the first and last segments to the secondary storage 110, and control proceeds to block 412 where the storage manager application 106 moves other segments to the secondary storage 110. At the conclusion of the execution of block 412 control returns to block 404 for writing additional host data.

If at block 406, a determination is made that segments are not to be moved to the secondary storage 110 from the cache storage 108, then control returns to block 404. If at block 408 a determination is made that the first and last segments have been moved to the secondary storage 110 then the storage manager application 106 moves other segments to the secondary storage 110.

In alternative embodiments in which hybrid segments 302 are used, the hybrid segments 302 are moved from the cache storage 108 to the secondary storage 110 before moving other segments. Other representations of segments may be used in alternative embodiments.

Figure 5:
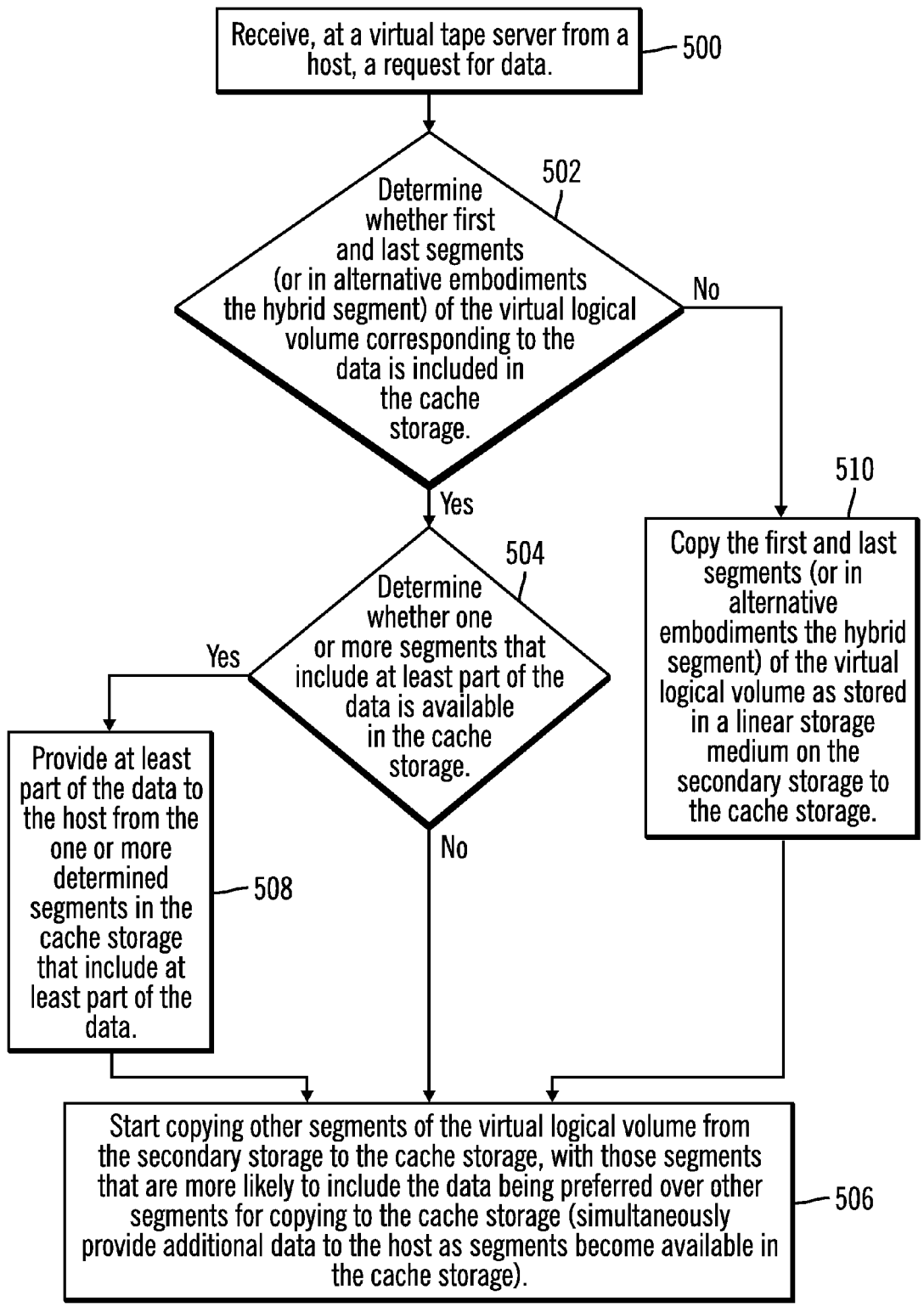
FIG. 5 illustrates operations performed at a virtual tape server in response to a request for data from a host, in accordance with certain embodiments.

FIG. 5 illustrates operations performed at the VTS 102 in response to a request for data from a host 104, in accordance with certain embodiments. The operations may be implemented by the storage manager application 106 included in the VTS 102.

Control starts at block 500, wherein the storage manager application 106 receives at the VTS 102 a request for data from the host 104. The storage manager application 106 determines (at block 502) whether first and last segments (or in alternative embodiments the hybrid segment) of the virtual logical volume 114 corresponding to the data is included in the cache storage 108. If so, then the storage manager application 106 determines (at block 504) whether one or more segments that include at least part of the data is available in the cache storage 108. If not, then the storage manager application 106 starts (at block 506) copying other segments of the virtual logical volume 114 from the secondary storage 110 to the cache storage 108, with those segments that are more likely to include the data being preferred over other segments for copying to the cache storage 108, wherein the storage manager application 106 may substantially simultaneously provide the additional data to the host 104 as segments become available in the cache storage 108.

If the storage manager application 106 determines (at block 504) that one or more segments that include at least part of the data is available in the cache storage 108, then control proceeds to block 508 where the storage manager application 106 provide at least part of the requested data to the host 104 from the one or more determined segments in the cache storage 108 that include at least part of the data, and control proceeds to block 506.

If at block 502, the storage manager application 106 determines that the first and last segments (on in alternative embodiments the hybrid segment) of the virtual logical volume 114 corresponding to the data is not included in the cache storage 108, then control proceeds to block 510, where the storage manager application 106 copies the first and last segments (or in alternative embodiments the hybrid segment) of the virtual logical volume 114 as stored in a linear storage medium 112 on the secondary storage 110 to the cache storage 108, and then control proceeds to block 506.

Therefore, FIG. 5 illustrates certain embodiments in which segmented virtual logical volumes are used by a VTS 102 to respond to requests for data from a host 104. Data in segments that are available in the cache storage 108 are returned to the host 104, and other segments are copied from the secondary storage 110 to the cache storage 108 to return to the host 104. In certain embodiments if the first and the last segments of the virtual logical volume 114 that includes the requested data is not available in the cache storage 108 then the first and the last segments are copied from the secondary storage 110 to the cache storage 108, before copying other segments of the virtual logical volume 114 to the cache storage 108. In alternative embodiments if the hybrid segment of the virtual logical volume 114 that includes the requested data is not available in the cache storage 108 then the hybrid segment is copied from the secondary storage 110 to the cache storage 108, before copying other segments to the cache storage 108.

Figure 6:
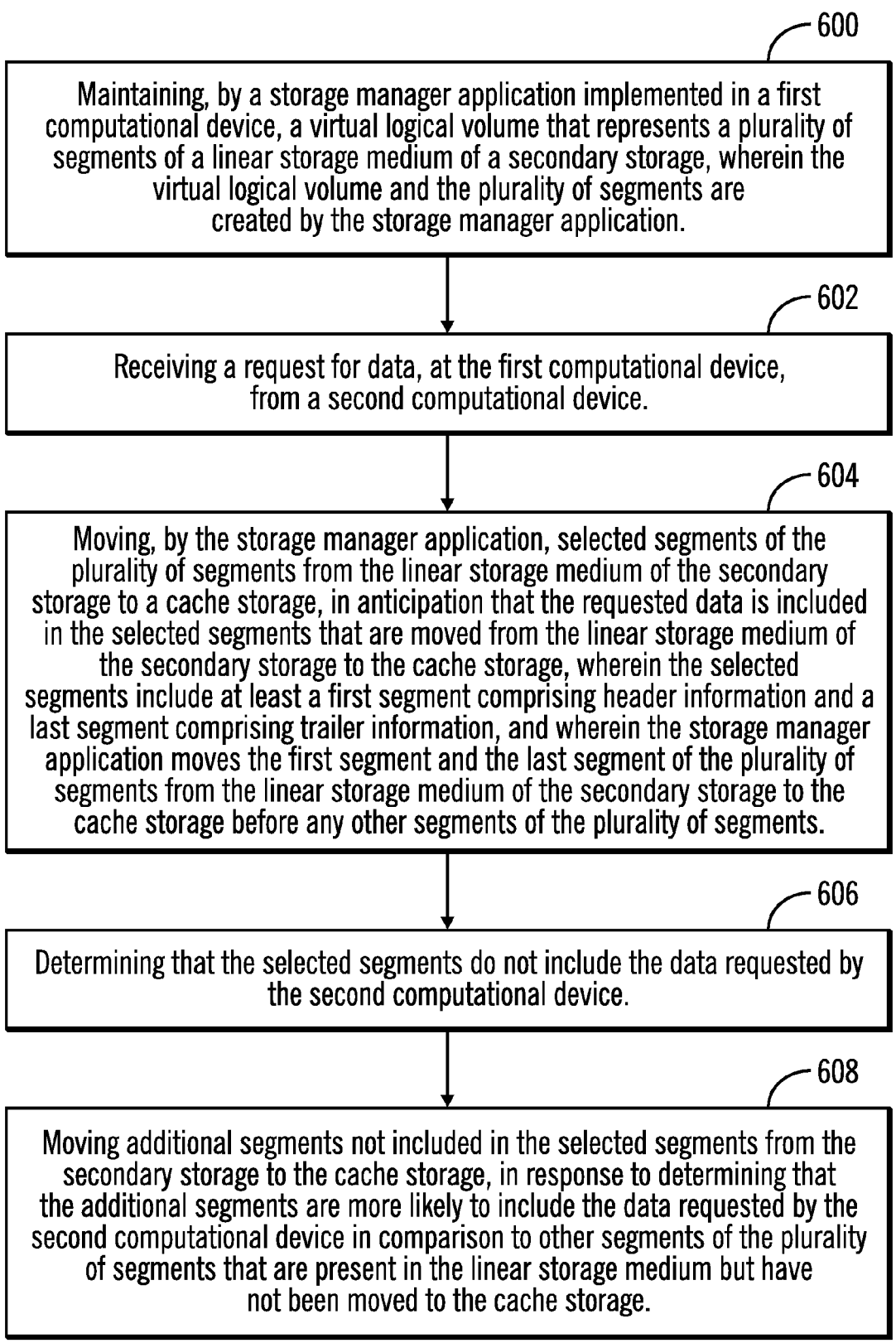
FIG. 6 illustrates operations implemented in the computing environment, in accordance with certain embodiments.

FIG. 6 illustrates operations implemented in the computing environment 100, in accordance with certain embodiments. The operations may be implemented by the storage manager application 106 included in the VTS 102.

Control starts at block 600, wherein a storage manager application 106 implemented in a first computational device 102 maintains a virtual logical volume 114 that represents a plurality of segments 116 of a linear storage medium 112 of a secondary storage 110, wherein the virtual logical volume 114 and the plurality of segments 116 are created by the storage manager application 106.

A request for data is received (at block 602), at the first computational device 102, from a second computational device 104, wherein in certain embodiments the first computational device 102 is a VTS and the second computational device 104 is a host.

The storage manager application 106 moves (at block 604) selected segments 118 of the plurality of segments 116 from the linear storage medium 112 of the secondary storage 110 to a cache storage 108, in anticipation that the requested data is included in the selected segments 118 that are moved from the linear storage medium 112 of the secondary storage 110 to the cache storage 108, wherein the selected segments 118 include at least a first segment (e.g., first segments 218, 232) comprising header information and a last segment (e.g., last segments 228, 234) comprising trailer information, and wherein the storage manager application 106 moves the first segment and the last segment of the plurality of segments 116 from the linear storage medium 112 of the secondary storage 110 to the cache storage 108 before any other segments of the plurality of segments.

Control proceeds to block 606, where the storage manager application 106 determines that the selected segments 118 do not include the data requested by the second computational device 104. The storage manager application 106 moves (at block 608) additional segments not included in the selected segments 118 from the secondary storage 110 to the cache storage 108, in response to determining that the additional segments are more likely to include the data requested by the second computational device 104 in comparison to other segments of the plurality of segments 116 that are present in the linear storage medium 112 but have not been moved to the cache storage 108.

Certain embodiments allow the handling of very large virtual logical volumes in a virtual tape environment, where the very large logical volumes are of a size such that each very large logical volume cannot be accommodated in its entirety in the cache storage 108. Certain embodiments segment the virtual logical volumes and reorder the segments of the logical volumes for anticipatory caching of the segments of the virtual logical volumes in the cache storage 108.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
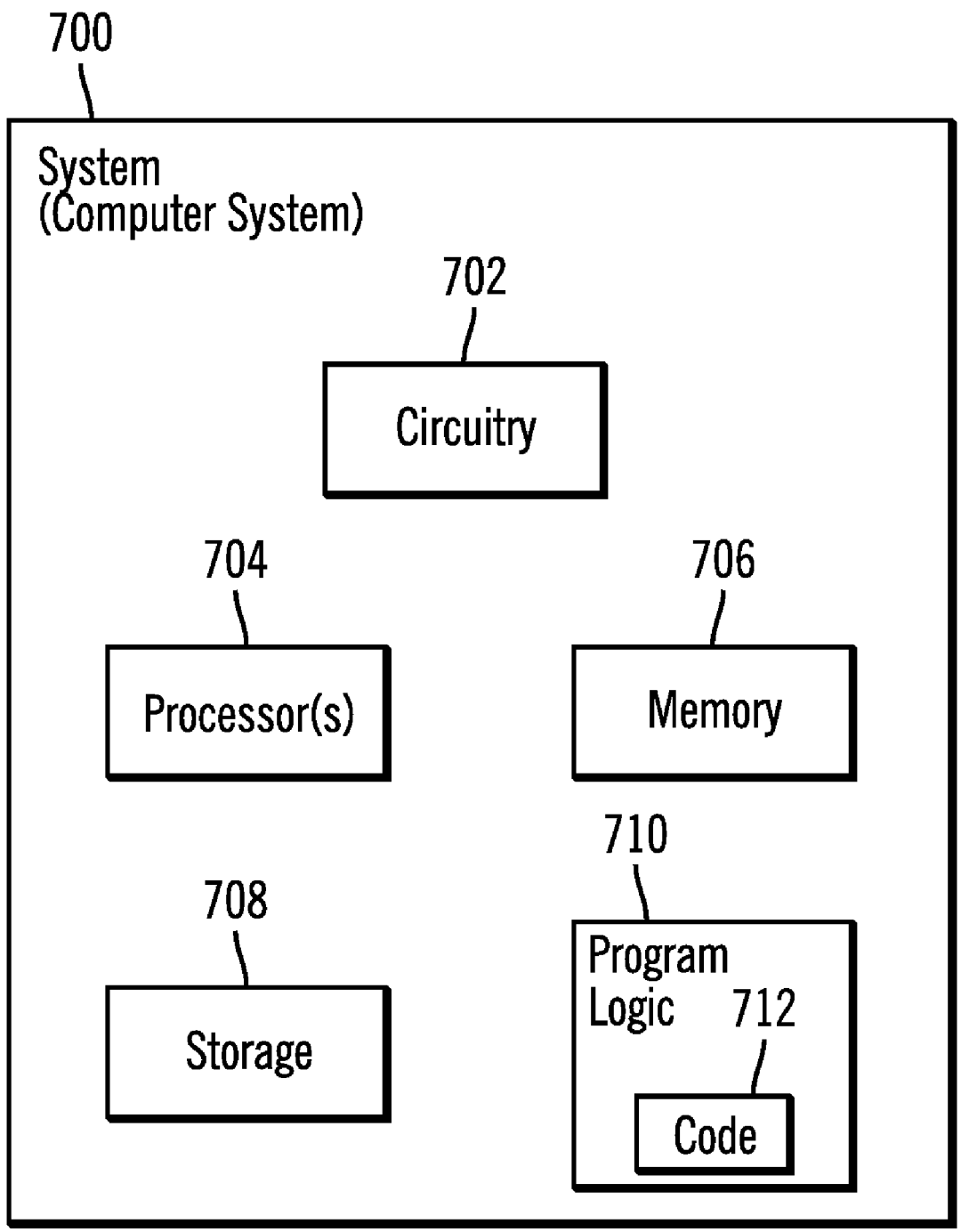
FIG. 7 illustrates a block diagram of a computer architecture in which certain described aspects of the embodiments are implemented.

FIG. 7 illustrates the architecture of computing system 700, wherein in certain embodiments the VTS 102 and the hosts 104 of the computing environments 100 of FIG. 1 may be implemented in accordance with the architecture of the computing system 700. The computing system 700 may also be referred to as a system, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

maintaining, by a storage manager application implemented in a first computational device, a virtual logical volume that represents a plurality of segments of a linear storage medium of a secondary storage, wherein the plurality of segments comprise a first segment comprising header information, and a last segment comprising trailer information, wherein the virtual logical volume and the plurality of segments are created by the storage manager application;

receiving a request for data, at the first computational device, from a second computational device;

in response to receiving the request for the data, determining whether the first segment and the last segment are present in a cache storage;

copying the first and the last segment from the linear storage medium to the cache storage, in response to determining that the first and the last segment are not present in the cache storage; and in response to copying the first and the last segment, moving, by the storage manager application, selected segments of the plurality of segments from the linear storage medium of the secondary storage to the cache storage, in anticipation that the requested data is included in the selected segments that are moved from the linear storage medium of the secondary storage to the cache storage, wherein the cache storage is incapable of storing at the same time all segments of the plurality of segments represented by the virtual logical volume.

2. The method of claim 1, wherein the plurality of segments comprise:
intervening segments between the first segment and the last segment, wherein the selected segments include at least the first segment and the last segment, and wherein the storage manager application moves the first segment and the last segment of the plurality of segments from the linear storage medium of the secondary storage to the cache storage before any other segments of the plurality of segments.

3. The method of claim 1, wherein the plurality of segments comprise:
intervening segments between the first segment and the last segment, wherein while writing data from the cache storage to the secondary storage to create space for additional data in the cache storage, the storage manager application writes the first segment and the last segment of the plurality of segments from the cache storage to the secondary storage before any other segments of the plurality of segments, and subsequently deletes the first and the last segment from the cache storage.

4. The method of claim 1, wherein the plurality of segments comprise:
a hybrid segment comprising header information and trailer information; and
other segments that follow the hybrid segment, wherein the selected segments includes at least the hybrid segment, and wherein the storage manager application moves the hybrid segment of the plurality of segments from the linear storage medium of the secondary storage to the cache storage, before any of the other segments of the plurality of segments.

5. The method of claim 1, further comprising:
determining, subsequent to the moving of the selected segments, that the selected segments do not include the data requested by the second computational device; and
moving additional segments not included in the selected segments from the secondary storage to the cache storage, in response to determining that the additional segments are more likely to include the data requested by the second computational device in comparison to other segments of the plurality of segments that are present in the linear storage medium but have not been moved to the cache storage.

6. The method of claim 1,
wherein the first computational device is a virtual tape server;
wherein the second computational device is a host;
wherein the cache storage is implemented in a disk device;
wherein the secondary storage is implemented in a tape device;
wherein the linear storage medium is a tape;
wherein all contents of the virtual logical volume fit on a single tape included in the tape device; and
wherein all contents of the virtual logical volume do not fit at the same time on the cache storage.

7. The method of claim 1, the method further comprising:
storing all contents of the virtual logical volume on a single linear storage medium included in the secondary storage, wherein all contents of the virtual logical volume do not fit at the same time in the cache storage, wherein by storing all contents of the virtual logical volume in the single linear storage medium the data is recalled to cache faster in comparison to all contents of the virtual logical volume being distributed among a plurality of linear storage mediums.

8. A system, comprising:
a memory; and
a processor coupled to the memory, wherein the processor performs operations, the operations comprising:
maintaining, by a storage manager application implemented in a first computational device, a virtual logical volume that represents a plurality of segments of a linear storage medium of a secondary storage, wherein the plurality of segments comprise a first segment comprising header information, and a last segment comprising trailer information, wherein the virtual logical volume and the plurality of segments are created by the storage manager application;
receiving a request for data, at the first computational device, from a second computational device;
in response to receiving the request for the data, determining whether the first segment and the last segment are present in a cache storage;
copying the first and the last segment from the linear storage medium to the cache storage, in response to determining that the first and the last segment are not present in the cache storage; and
in response to copying the first and the last segment, moving, by the storage manager application, selected segments of the plurality of segments from the linear storage medium of the secondary storage to the cache storage, in anticipation that the requested data is included in the selected segments that are moved from the linear storage medium of the secondary storage to the cache storage, wherein the cache storage is incapable of storing at the same time all segments of the plurality of segments represented by the virtual logical volume.

9. The system of claim 8, wherein the plurality of segments comprise:
intervening segments between the first segment and the last segment, wherein the selected segments include at least the first segment and the last segment, and wherein the storage manager application moves the first segment and the last segment of the plurality of segments from the linear storage medium of the secondary storage to the cache storage before any other segments of the plurality of segments.

10. The system of claim 8, wherein the plurality of segments comprise:
intervening segments between the first segment and the last segment, wherein while writing data from the cache storage to the secondary storage to create space for additional data in the cache storage, the storage manager application writes the first segment and the last segment of the plurality of segments from the cache storage to the secondary storage before any other segments of the plurality of segments, and subsequently deletes the first and the last segment from the cache storage.

11. The system of claim 8, wherein the plurality of segments comprise:
a hybrid segment comprising header information and trailer information; and
other segments that follow the hybrid segment, wherein the selected segments includes at least the hybrid segment, and wherein the storage manager application moves the hybrid segment of the plurality of segments from the linear storage medium of the secondary storage to the cache storage, before any of the other segments of the plurality of segments.

12. The system of claim 8, the operations further comprising:
  determining, subsequent to the moving of the selected segments, that the selected segments do not include the data requested by the second computational device; and
  moving additional segments not included in the selected segments from the secondary storage to the cache storage, in response to determining that the additional segments are more likely to include the data requested by the second computational device in comparison to other segments of the plurality of segments that are present in the linear storage medium but have not been moved to the cache storage.

13. The system of claim 8,
  wherein the first computational device is a virtual tape server;
  wherein the second computational device is a host;
  wherein the cache storage is implemented in a disk device;
  wherein the secondary storage is implemented in a tape device;
  wherein the linear storage medium is a tape;
  wherein all contents of the virtual logical volume fit on a single tape included in the tape device; and
  wherein all contents of the virtual logical volume do not fit at the same time on the cache storage.

14. The system of claim 8, the operations further comprising:
  storing all contents of the virtual logical volume on a single linear storage medium included in the secondary storage, wherein all contents of the virtual logical volume do not fit at the same time in the cache storage, wherein by storing all contents of the virtual logical volume in the single linear storage medium the data is recalled to cache faster in comparison to all contents of the virtual logical volume being distributed among a plurality of linear storage mediums.

15. A computer readable storage medium, wherein code stored in the computer readable storage medium when executed by a machine causes operations to be performed, the operations comprising:
  maintaining, by a storage manager application implemented in a first computational device, a virtual logical volume that represents a plurality of segments of a linear storage medium of a secondary storage, wherein the plurality of segments comprise a first segment comprising header information, and a last segment comprising trailer information, wherein the virtual logical volume and the plurality of segments are created by the storage manager application;
  receiving a request for data, at the first computational device, from a second computational device;
  in response to receiving the request for the data, determining whether the first segment and the last segment are present in a cache storage;
  copying the first and the last segment from the linear storage medium to the cache storage, in response to determining that the first and the last segment are not present in the cache storage; and
  in response to copying the first and the last segment, moving, by the storage manager application, selected segments of the plurality of segments from the linear storage medium of the secondary storage to the cache storage, in anticipation that the requested data is included in the selected segments that are moved from the linear storage medium of the secondary storage to the cache storage, wherein the cache storage is incapable of storing at the same time all segments of the plurality of segments represented by the virtual logical volume.

16. The computer readable storage medium of claim 15, wherein the plurality of segments comprise:
  intervening segments between the first segment and the last segment, wherein the selected segments include at least the first segment and the last segment, and wherein the storage manager application moves the first segment and the last segment of the plurality of segments from the linear storage medium of the secondary storage to the cache storage before any other segments of the plurality of segments.

17. The computer readable storage medium of claim 15, wherein the plurality of segments comprise:
  intervening segments between the first segment and the last segment, wherein while writing data from the cache storage to the secondary storage to create space for additional data in the cache storage, the storage manager application writes the first segment and the last segment of the plurality of segments from the cache storage to the secondary storage before any other segments of the plurality of segments, and subsequently deletes the first and the last segment from the cache storage.

18. The computer readable storage medium of claim 15, wherein the plurality of segments comprise:
  a hybrid segment comprising header information and trailer information; and
  other segments that follow the hybrid segment, wherein the selected segments includes at least the hybrid segment, and wherein the storage manager application moves the hybrid segment of the plurality of segments from the linear storage medium of the secondary storage to the cache storage, before any of the other segments of the plurality of segments.

19. The computer readable storage medium of claim 15, the operations further comprising:
  determining, subsequent to the moving of the selected segments, that the selected segments do not include the data requested by the second computational device; and
  moving additional segments not included in the selected segments from the secondary storage to the cache storage, in response to determining that the additional segments are more likely to include the data requested by the second computational device in comparison to other segments of the plurality of segments that are present in the linear storage medium but have not been moved to the cache storage.

20. The computer readable storage medium of claim 15,
  wherein the first computational device is a virtual tape server;
  wherein the second computational device is a host;
  wherein the cache storage is implemented in a disk device;
  wherein the secondary storage is implemented in a tape device;
  wherein the linear storage medium is a tape;
  wherein all contents of the virtual logical volume fit on a single tape included in the tape device; and
  wherein all contents of the virtual logical volume do not fit at the same time on the cache storage.

21. The computer readable storage medium of claim 15, the operations further comprising:
  storing all contents of the virtual logical volume on a single linear storage medium included in the secondary storage, wherein all contents of the virtual logical volume do not fit at the same time in the cache storage, wherein by storing all contents of the virtual logical volume in the single linear storage medium the data is recalled to cache faster in comparison to all contents of the virtual logical volume being distributed among a plurality of linear storage mediums.

22. A method for deploying computing infrastructure, comprising integrating computer-readable code into a computer, wherein the code in combination with the computer is capable of performing:
   maintaining, by a storage manager application implemented in a first computational device, a virtual logical volume that represents a plurality of segments of a linear storage medium of a secondary storage, wherein the plurality of segments comprise a first segment comprising header information, and a last segment comprising trailer information, wherein the virtual logical volume and the plurality of segments are created by the storage manager application;
   receiving a request for data, at the first computational device, from a second computational device;
   in response to receiving the request for the data, determining whether the first segment and the last segment are present in a cache storage;
   copying the first and the last segment from the linear storage medium to the cache storage, in response to determining that the first and the last segment are not present in the cache storage; and
   in response to copying the first and the last segment, moving, by the storage manager application, selected segments of the plurality of segments from the linear storage medium of the secondary storage to the cache storage, in anticipation that the requested data is included in the selected segments that are moved from the linear storage medium of the secondary storage to the cache storage, wherein the cache storage is incapable of storing at the same time all segments of the plurality of segments represented by the virtual logical volume.

23. The method for deploying computing infrastructure of claim 22, wherein the plurality of segments comprise:
   intervening segments between the first segment and the last segment, wherein the selected segments include at least the first segment and the last segment, and wherein the storage manager application moves the first segment and the last segment of the plurality of segments from the linear storage medium of the secondary storage to the cache storage before any other segments of the plurality of segments.

24. The method for deploying computing infrastructure of claim 22, wherein the plurality of segments comprise:
   intervening segments between the first segment and the last segment, wherein while writing data from the cache storage to the secondary storage to create space for additional data in the cache storage, the storage manager application writes the first segment and the last segment of the plurality of segments from the cache storage to the secondary storage before any other segments of the plurality of segments, and subsequently deletes the first and the last segment from the cache storage.

25. The method for deploying computing infrastructure of claim 22, wherein the plurality of segments comprise:
   a hybrid segment comprising header information and trailer information; and
   other segments that follow the hybrid segment, wherein the selected segments includes at least the hybrid segment, and wherein the storage manager application moves the hybrid segment of the plurality of segments from the linear storage medium of the secondary storage to the cache storage, before any of the other segments of the plurality of segments.

26. The method for deploying computing infrastructure of claim 22, wherein the code in combination with the computer is capable of performing:
   determining, subsequent to the moving of the selected segments, that the selected segments do not include the data requested by the second computational device; and
   moving additional segments not included in the selected segments from the secondary storage to the cache storage, in response to determining that the additional segments are more likely to include the data requested by the second computational device in comparison to other segments of the plurality of segments that are present in the linear storage medium but have not been moved to the cache storage.

27. The method for deploying computing infrastructure of claim 22,
   wherein the first computational device is a virtual tape server;
   wherein the second computational device is a host;
   wherein the cache storage is implemented in a disk device;
   wherein the secondary storage is implemented in a tape device;
   wherein the linear storage medium is a tape;
   wherein all contents of the virtual logical volume fit on a single tape included in the tape device; and
   wherein all contents of the virtual logical volume do not fit at the same time on the cache storage.

28. The method for deploying computing infrastructure of claim 22, wherein the code in combination with the computer is further capable of performing:
   storing all contents of the virtual logical volume on a single linear storage medium included in the secondary storage, wherein all contents of the virtual logical volume do not fit at the same time in the cache storage, wherein by storing all contents of the virtual logical volume in the single linear storage medium the data is recalled to cache faster in comparison to all contents of the virtual logical volume being distributed among a plurality of linear storage mediums.

29. A system, comprising:
   means for maintaining, by a storage manager application implemented in a first computational device, a virtual logical volume that represents a plurality of segments of a linear storage medium of a secondary storage, wherein the plurality of segments comprise a first segment comprising header information, and a last segment comprising trailer information, wherein the virtual logical volume and the plurality of segments are created by the storage manager application;
   means for receiving a request for data, at the first computational device, from a second computational device;
   means for determining whether the first segment and the last segment are present in a cache storage, in response to receiving the request for the data,;
   means for copying the first and the last segment from the linear storage medium to the cache storage, in response to determining that the first and the last segment are not present in the cache storage; and
   means for moving, by the storage manager application, in response to copying the first and the last segment, selected segments of the plurality of segments from the linear storage medium of the secondary storage to the cache storage, in anticipation that the requested data is included in the selected segments that are moved from the linear storage medium of the secondary storage to the cache storage, wherein the cache storage is incapable of storing at the same time all segments of the plurality of segments represented by the virtual logical volume.

30. The system of claim 29, wherein the plurality of segments comprise:
intervening segments between the first segment and the last segment, wherein the selected segments include at least the first segment and the last segment, and wherein the storage manager application moves the first segment and the last segment of the plurality of segments from the linear storage medium of the secondary storage to the cache storage before any other segments of the plurality of segments.

31. The system of claim 29, wherein the plurality of segments comprise:
intervening segments between the first segment and the last segment, wherein while writing data from the cache storage to the secondary storage to create space for additional data in the cache storage, the storage manager application writes the first segment and the last segment of the plurality of segments from the cache storage to the secondary storage before any other segments of the plurality of segments, and subsequently deletes the first and the last segment from the cache storage.

32. The system of claim 29, wherein the plurality of segments comprise:
a hybrid segment comprising header information and trailer information; and
other segments that follow the hybrid segment, wherein the selected segments includes at least the hybrid segment, and wherein the storage manager application moves the hybrid segment of the plurality of segments from the linear storage medium of the secondary storage to the cache storage, before any of the other segments of the plurality of segments.

33. The system of claim 29, further comprising:
means for determining, subsequent to the moving of the selected segments, that the selected segments do not include the data requested by the second computational device; and
means for moving additional segments not included in the selected segments from the secondary storage to the cache storage, in response to determining that the additional segments are more likely to include the data requested by the second computational device in comparison to other segments of the plurality of segments that are present in the linear storage medium but have not been moved to the cache storage.

34. The system of claim 29,
wherein the first computational device is a virtual tape server;
wherein the second computational device is a host;
wherein the cache storage is implemented in a disk device;
wherein the secondary storage is implemented in a tape device;
wherein the linear storage medium is a tape;
wherein all contents of the virtual logical volume fit on a single tape included in the tape device; and
wherein all contents of the virtual logical volume do not fit at the same time on the cache storage.

35. The system of claim 29, further comprising:
means for storing all contents of the virtual logical volume on a single linear storage medium included in the secondary storage, wherein all contents of the virtual logical volume do not fit at the same time in the cache storage, wherein by storing all contents of the virtual logical volume in the single linear storage medium the data is recalled to cache faster in comparison to all contents of the virtual logical volume being distributed among a plurality of linear storage mediums.

* * * * *